United States Patent [19]
Eto

[11] Patent Number: 5,418,725
[45] Date of Patent: May 23, 1995

[54] TORQUE SPLIT CONTROL APPARATUS

[75] Inventor: Yoshiyuki Eto, Isehara, Japan

[73] Assignee: Nissan Motor Co., Ltd., Yokohama, Japan

[21] Appl. No.: 104,534

[22] Filed: Aug. 11, 1993

[30] Foreign Application Priority Data

Sep. 22, 1992 [JP] Japan ................... 4-251796

[51] Int. Cl.6 ........................................... B60K 17/348
[52] U.S. Cl. ............................. 364/426.03; 180/197; 180/233; 180/248
[58] Field of Search ............... 364/426.02, 426.03; 180/197, 233, 248, 249

[56] References Cited

U.S. PATENT DOCUMENTS

| | | | |
|---|---|---|---|
| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,874,056 | 10/1989 | Naito | 180/233 |
| 4,887,689 | 12/1989 | Naito | 180/233 |
| 5,132,908 | 7/1992 | Eto et al. | 364/426.03 |
| 5,168,955 | 12/1992 | Naito | 180/197 |
| 5,195,037 | 3/1993 | Tezuka | 364/426.02 |
| 5,197,566 | 3/1993 | Watanabe et al. | 364/426.02 |
| 5,245,542 | 9/1993 | Itoh et al. | 180/197 |
| 5,251,719 | 10/1993 | Eto et al. | 180/197 |
| 5,255,192 | 10/1993 | Ito et al. | 180/197 |

Primary Examiner—Gary Chin
Attorney, Agent, or Firm—Foley & Lardner

[57] ABSTRACT

A torque split control apparatus for use with 4WD type vehicle. The drive from the engine is transmitted to the primary drive wheels of the vehicle and to the secondary drive wheels of the vehicle through a torque distributing clutch capable of varying a torque transmitted to the secondary drive wheels. First and second control gains are calculated. The first control gain is inversely proportional to the vehicle lateral acceleration. The second control gain is inversely proportional to the vehicle lateral acceleration. The second control gain is smaller than the first control gain. A start indication signal is produced when the vehicle is starting. A target torque is calculated. The target torque is proportional to the first control gain and to the wheel speed difference in the presence of the start indication signal. The target torque is proportional to the second control gain and to the wheel speed difference in the absence of the start indication signal. The torque distributing clutch is controlled to transmit the calculated target torque to the secondary drive wheels.

6 Claims, 4 Drawing Sheets

TORQUE SPLIT CONTROL APPARATUS

BACKGROUND OF THE INVENTION

This invention relates to a torque split control apparatus for use with a 4WD automotive vehicle supported on a pair of primary drive wheels and a pair of secondary drive wheels.

For example, U.S. Pat. No. 5,132,908 discloses a torque split control apparatus for use with an automotive vehicle. The conventional torque split control apparatus is arranged to transmit the drive from the engine to the primary drive wheels (rear road wheels) of the vehicle and to the secondary drive wheels (front road wheels) of the vehicle through a torque distributing clutch capable of varying a torque transmitted to the secondary drive wheels. It is the current practice to control the torque distributing clutch to adjust the transmitted torque in proportion to the degree to which the rear road wheels spin by increasing the transmitted torque as the front and rear road wheel rotational speed difference increases and decreasing the transmitted torque control gain, which is proportional to the front and rear road wheel rotational speed difference, as the vehicle lateral acceleration increases. The control gain is determined in inversely proportion to the vehicle lateral acceleration. This is effective to provide a greater control gain for a road surface having a low friction factor and a small control gain for a road surface having a high friction factor so as to provide a neutral steer characteristic regardless of the road surface friction factor.

With the conventional torque split control apparatus, however, the control gain is determined only by the vehicle lateral acceleration regardless of whether the vehicle is starting or the vehicle is moving in a straight or curved path. If the control gain is set at a greater value for the vehicle lateral acceleration to provide a sufficient traction performance when the vehicle is starting, a great torque WILL be transmitted to the front road wheel so as to suppress the rear wheel spin even with a great degree of depression of the accelerator pedal when the vehicle is moving on a road surface having a low friction factor. As a result, the driver will continue to operate the vehicle without any indication that the road surface has a low friction factor. If the control gain is set at a smaller value for the vehicle lateral acceleration to provide a feel of rear road wheel spin in response to an accelerator pedal operation so as to provide an indication to the driver when the vehicle is moving on a road surface having a low friction factor, however, the rear road wheels will spin so that a sufficient traction performance cannot be obtained when the vehicle is starting on a road surface having a low friction factor.

SUMMARY OF THE INVENTION

Therefore, it is a main object of the invention to provide an improved torque split control apparatus which can ensure a sufficient traction performance when the vehicle is starting and can provide a proper indication to the driver when the vehicle is moving on a road surface having a low friction factor.

There is provided, in accordance with the invention, a torque split control apparatus for use with a 4WD type automotive vehicle including an engine for producing a drive. The automotive vehicle is supported on a pair of primary drive wheels and a pair of secondary drive wheels. The torque split control apparatus comprises means for transmitting the drive from the engine to the primary drive wheels and to the secondary drive wheels through a torque distributing clutch capable of varying a torque transmitted to the secondary drive wheels, means for sensing a wheel speed difference between speeds of rotation of the primary and secondary drive wheels, and means for sensing a vehicle lateral acceleration. First and second control gains are calculated. The first control gain is inversely proportional to the vehicle lateral acceleration. The second control gain is inversely proportional to the vehicle lateral acceleration. The second control gain is smaller than the first control gain. A start indication signal is produced when the vehicle is starting. A target torque is calculated. The target torque is proportional to the first control gain and to the wheel speed difference in the presence of the start indication signal. The target torque is proportional to the second control gain and to the wheel speed difference in the absence of the start indication signal. The torque distributing clutch is controlled to transmit the calculated target torque to the secondary drive wheels.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
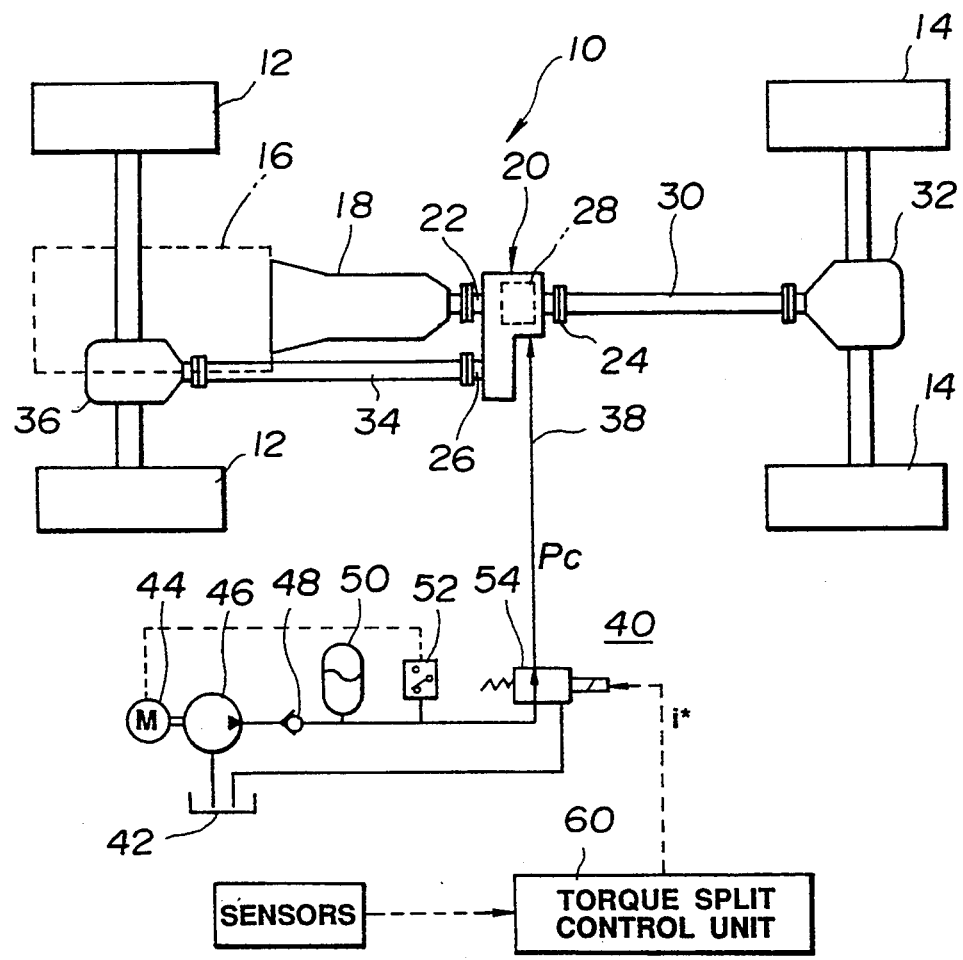
FIG. 1 is a schematic block diagram showing one embodiment of a torque split control apparatus made in accordance with the invention.

With reference to the drawings, and in particular to FIG. 1, there is shown a schematic block diagram of a torque split (driving force distribution) control apparatus embodying the invention. An automotive vehicle, generally designated by the numeral 10, is supported on a pair of front road wheels 12 and a pair of rear road wheels 14. The vehicle 10 includes an internal combustion engine 16 from which the drive is transmitted through a transmission 18 to a transfer 20. The transfer 20 has an input shaft 22 coupled to the transmission 18, a first output shaft 24 coupled to a rear propeller shaft 30 and a second output shaft 26 coupled to a front propeller shaft 34. The transfer 20 directly transmits the drive from the transmission 22 to the rear propeller shaft 30. The drive is then taken by a rear differential 32 which divides the drive equally between the two rear road wheels 14. The transfer 20 also includes a transfer clutch (torque distribution clutch) 28 through which the front propeller shaft 34 is connected to the transmission 18. Thus, the drive from the transmission 18 is transmitted through the transfer Clutch 28 to the front propeller shaft 34. The drive is then taken by a front differential 36 which divides the drive equally between the two front road wheels 12. The transfer clutch 28, which may be taken in the form of a wet type multiple disc clutch, is engaged to transmit the torque from the transmission 18 to the front propeller shaft 34 when it receives a control pressure Pc in the form of a hydraulic pressure supplied through a conduit 38 from a pressure source 40. In the absence of the control pressure Pc, the transfer clutch 28 is disengaged to disconnect the torque from the transmission 18 from the front propeller shaft 34. The force under which the transfer clutch 28 is engaged, that is, the ratio of the torques distributed to the front and rear road wheels 12 and 14 of the vehicle 10 is determined by the level of the control pressure Pc supplied from the pressure source 40 through the conduit 38 to the transfer clutch 28. The transfer 20 and the transfer clutch 28 are described in detail, and is incorporated therein by reference, IN commonly-assigned, U.S. Pat. Nos. 4,754,834, 4,757,870, 4,773,500, 4,776,424, 4,846,298, 4,874,056 and 4,887,689.

The pressure source 40 includes an oil pump 46 operated by an electric motor 44 to suck oil from an oil reservoir 42. The oil pressure (primary pressure) discharged from the oil pump 46 is introduced through a check valve 48 to charge an accumulator 50. A relief switch 52 is provided to monitor the oil pressure (secondary pressure) charged in the accumulator 50. The relief switch 52 produces a signal to stop the electric motor 44 when the secondary pressure exceeds a predetermined value. Thus, the secondary pressure is maintained at the predetermined value. The regulated pressure is fed through a solenoid valve 54 to the conduit 38. The solenoid valve 54 responds to a dither current i* fed thereto from a torque split control unit 60 by controlling the level of the control pressure Pc fed through the conduit 38 to the transfer clutch 28.

Figure 2:
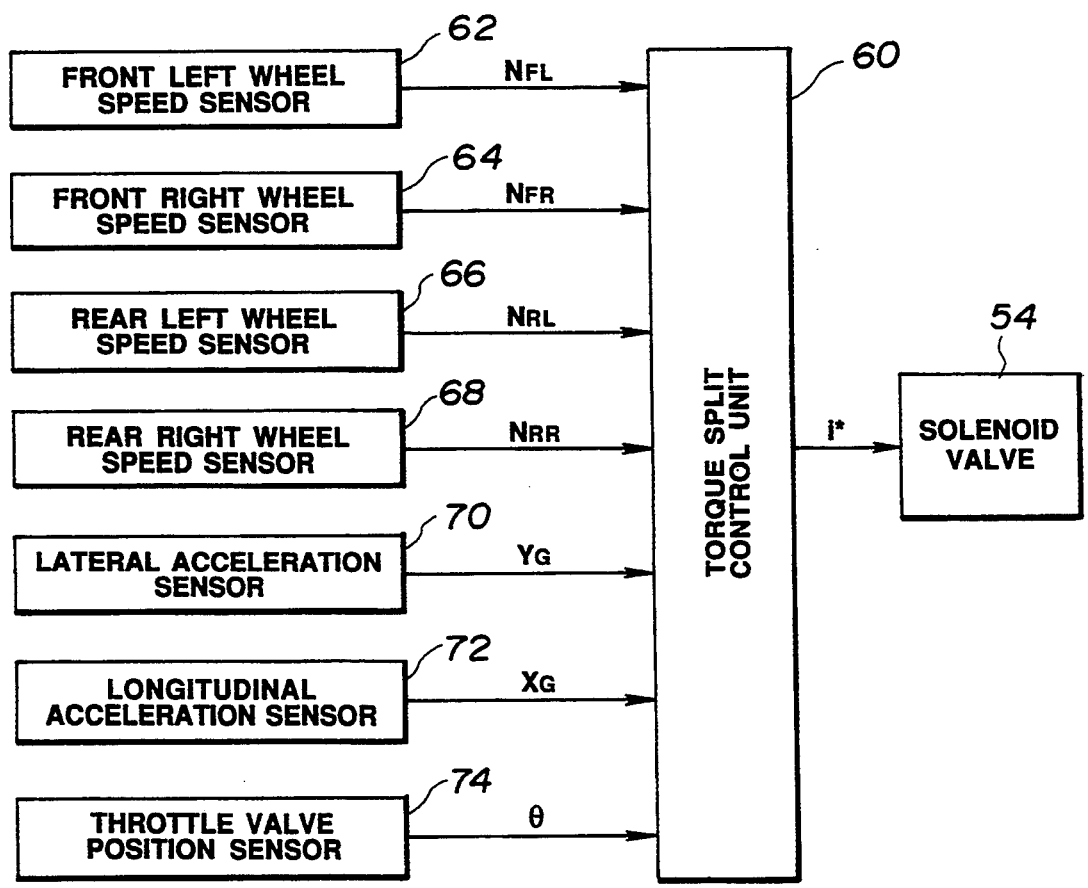
FIG. 2 is a schematic block diagram showing the torque split control unit used in the torque split control apparatus of FIG. 1.

The level of the control pressure Pc introduced through the conduit 38 to the transfer clutch 28, this being determined by the magnitude of the dither current i* supplied from the torque split control unit 60 to the solenoid valve 54, is repetitively determined based upon various vehicle conditions that are sensed during its operation. These sensed conditions include front left road wheel rotational speed, front right road wheel rotational speed, rear left road wheel rotational speed, rear right road wheel rotational speed, vehicle lateral acceleration, vehicle longitudinal acceleration, and throttle valve position. Thus, a front left road wheel rotational speed sensor 62, a front right road wheel rotational speed sensor 64, a rear left road wheel rotational speed sensor 66, a rear right road wheel rotational speed sensor 68, a lateral acceleration sensor 70, a longitudinal acceleration sensor 72 and a throttle valve position sensor 74 are connected to the torque split control unit 60, as shown in FIG. 2. The front left road wheel rotational speed sensor 62 is positioned to sense the speed of rotation of the front left road wheel and it produces a signal $N_{FL}$ indicative of the sensed front left road wheel rotational speed. The front right road wheel rotational speed sensor 64 is positioned to sense the speed of rotation of the front right road wheel and it produces a signal $N_{FR}$ indicative of the sensed front right road wheel rotational speed. The rear left road wheel rotational speed sensor 66 is positioned to sense the speed of rotation of the rear left road wheel and it produces a signal $N_{RL}$ indicative of the sensed rear left road wheel rotational speed. The rear right road wheel rotational speed sensor 68 is positioned to sense the speed of rotation of the rear right road wheel and it produces a signal $N_{RR}$ indicative of the sensed rear right road wheel rotational speed. The lateral acceleration sensor 70 is positioned to sense the lateral acceleration of the vehicle 10 and it produces a signal $Y_G$ indicative of the sensed vehicle lateral acceleration. The longitudinal acceleration sensor 72 is positioned to sense the longitudinal acceleration of the vehicle 10 and it produces a signal $X_G$ indicative of the sensed vehicle longitudinal acceleration. The throttle valve position sensor 74 is positioned to sense the degree of opening of the throttle valve provided to control the amount of air to the engine 16 and it produces a signal $\theta$ indicative of the sensed throttle valve position.

The torque split control unit 60 may employ a digital computer which includes a central processing unit (CPU), a random access memory (RAM), a read only memory (ROM), and an input/output control circuit (I/O). The central processing unit communicates with the rest of the computer via data bus. The read only memory contains the program for operating the central processing unit and further contains appropriate data in look-up tables used in calculating an appropriate value for the dither current i* supplied to the solenoid valve 54. A control word specifying a desired dither current magnitude is periodically transferred by the central processing unit to the input/output control circuit. The input/output control circuit converts the received control word in to a corresponding dither current i* for application to the solenoid valve 54.

Figure 3:
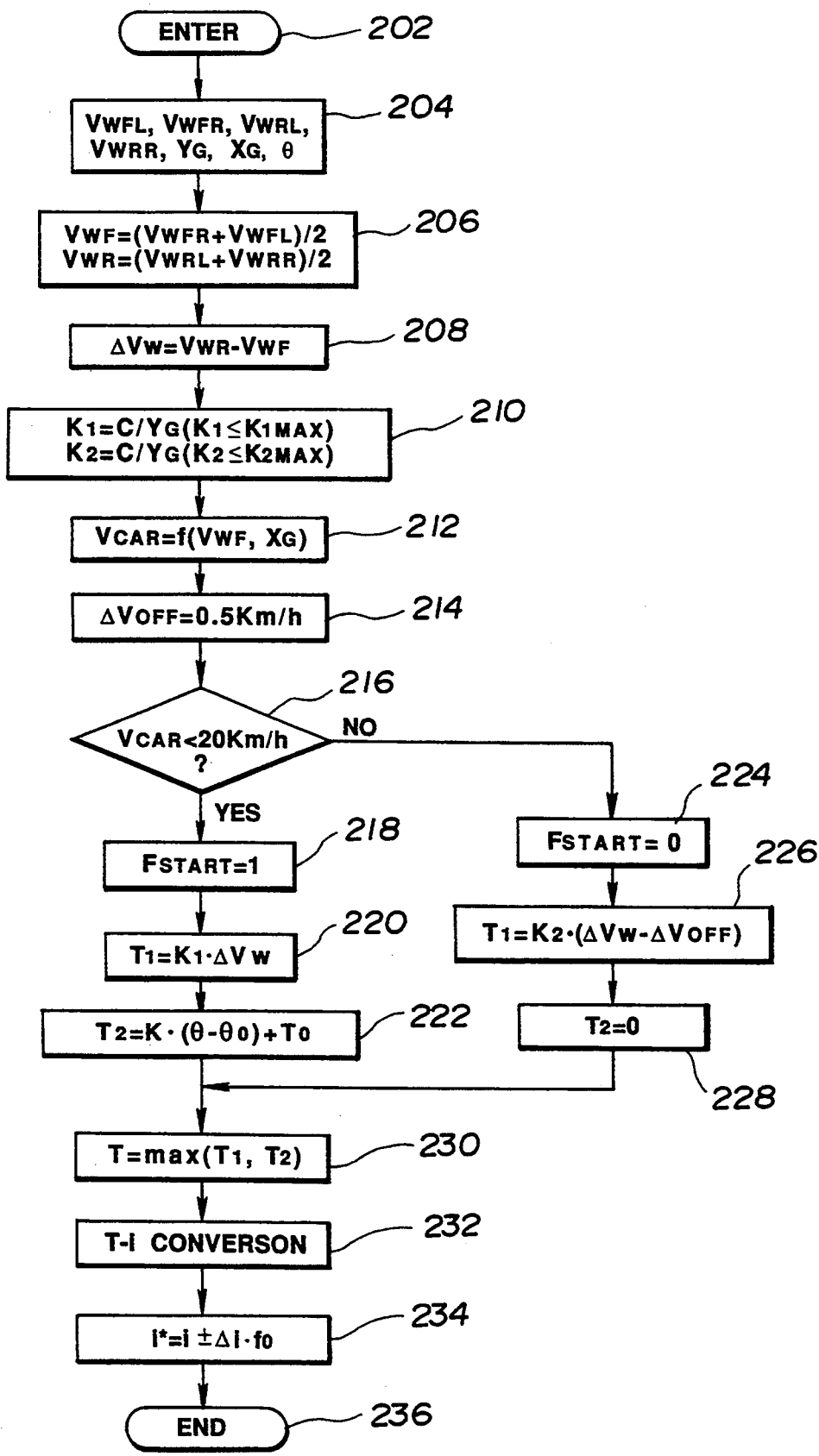
FIG. 3 is a flow diagram showing the programming of the digital computer used in the torque split control unit of FIG. 2.
Figure 4A:
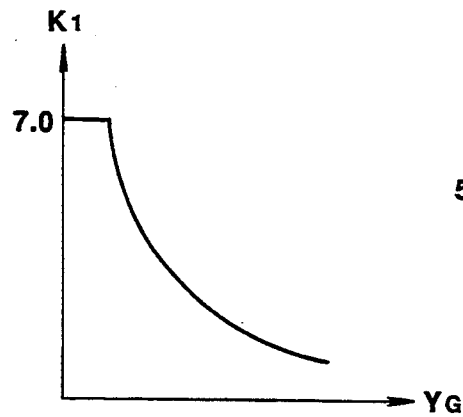
FIG. 4A is a graph of first control gain ($K_1$) versus vehicle lateral acceleration ($Y_G$)
Figure 4B:
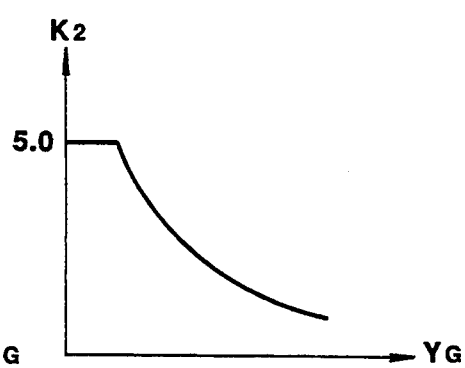
FIG. 4B is a graph of second control gain ($K_2$) versus vehicle lateral acceleration ($Y_G$)

FIG. 3 is a flow diagram showing the programming of the digital computer used in the torque split control unit 60 to calculate an appropriate value for the dither current i* supplied to the solenoid valve 54. The computer program is entered at the point 202 at uniform intervals of time (for example, 10 msec). At the point 204 in the program, the front left road wheel rotational speed $V_{WFL}$, the front right road wheel rotational speed $V_{WFR}$, the rear left road wheel rotational speed $V_{WRL}$, the rear right road wheel rotational speed $V_{WRR}$, the lateral acceleration $Y_G$, the longitudinal acceleration $X_G$ and the throttle valve position $\theta$ are read into the computer memory. At the point 206 in the program, the central processing unit calculates the front road wheel rotational speed $V_{WF}$ by averaging the front left and right road wheel rotational speeds $V_{WFL}$ and $V_{WFR}$ and the rear road wheel rotational speed $V_{WR}$ by averaging the rear left and right road wheel rotational speeds $V_{WRL}$ and $V_{WRR}$. At the point 208 in the program, the front and rear road wheel rotational speed difference $\Delta V_W$ ($\geq 0$) of the front road wheel rotational speed $V_{WF}$ from the rear road wheel rotational speed $V_{WR}$ is calculated. At the point 210 in the program, the first and second control gains $K_1$ and $K_2$ are calculated as $K_1 = C/Y_G$ ($K_1 \leq K_{1MAX}$) and $K_2 = C/Y_G$ ($K_2 < K_{2MAX}$). Assuming now that $C = 1$ [G·kgm/km/h], $K_{1MAX} = 7$ [KGM/KM/H] and $K_{2MAX} = 5$ [kgm/km/h], the first control gain $K_1$ may be calculated from a relationship that specifies the first control gain $K_1$ as a function of lateral acceleration $Y_G$, as shown in FIG. 4A, and the second control gain $K_2$ may be calculated from a relationship that specifies the second control gain $K_2$ as a function of lateral acceleration $Y_G$, as shown in FIG. 4B. At the point 212 in the program, the vehicle speed $V_{CAR}$ is calculated as a function of front road wheel rotational speed $V_{WF}$ and longitudinal acceleration $X_G$. At the point 214 in the program, the dead zone $\Delta V_{OFF}$ of the front and rear road wheel rotational speed difference is set at 0.5 km/h. The dead zone $\Delta V_{OFF}$ may be calculated as a function of vehicle speed $V_{CAR}$.

Figure 5A:
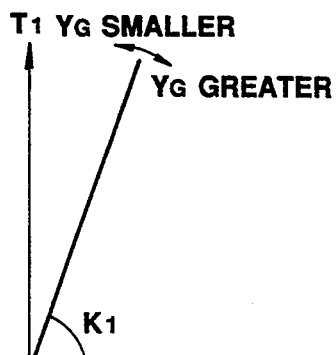
FIG. 5A is a graph of control torque ($T_1$) versus front and rear road wheel rotational speed difference ($\Delta V_W$)
Figure 6:
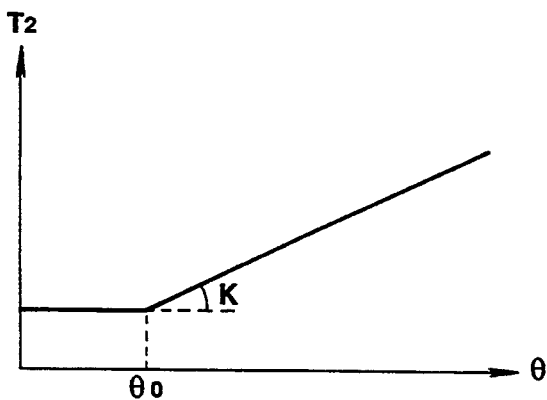
FIG. 6 is a graph of starting torque ($T_2$) versus throttle valve position ($\theta$).

At the point 216 in the program, a determination is made as to whether or not the vehicle speed $V_{CAR}$ is less than 20 km/h. If the answer to this question is "yes", then it means that the vehicle is starting and the program proceeds to the point 218 where a start flag $F_{START}$ is set at 1. At the point 220 in the program, the control torque $T_1$ is calculated as $T_1 = K_1 \cdot \Delta V_W$. The control torque $T_1$ may be calculated from a relationship that specifies the control torque $T_1$ as a function of first control gain $K_1$ and front and rear road wheel rotational speed difference $\Delta V_W$, as shown in FIG. 5A. At the point 222 in the program, the starting torque $T_2$ is calculated as $T_2 = K \cdot (\theta - \theta_0) + T_0$. The starting torque $T_2$ may be calculated from a relationship that specifies the starting torque $T_2$ as a function of front and rear road wheel rotational speed difference $\Delta V_W$, as shown in FIG. 6, where $K = 0.5$[kgm/deg], $T_0 = 4$[kgm] and $\theta_0 = 30$ [deg]. Following this, the program proceeds to the point 230.

Figure 5B:
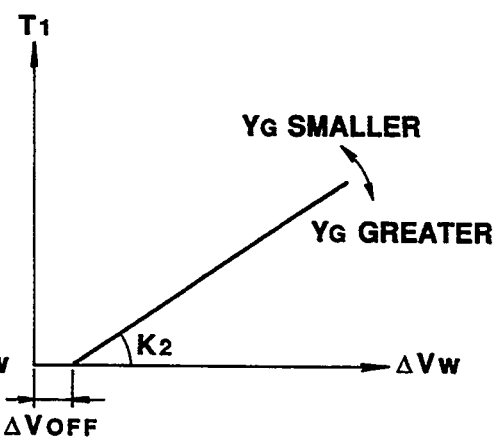
FIG. 5B is a graph of control torque ($T_1$) versus front and rear road wheel rotational speed difference ($\Delta V_W$)

If the answer to the question inputted at the point 216 is "no" then the program proceeds to the point 224 where the start flag $F_{START}$ is cleared to zero. At the point 226 in the program, the control torque $T_1$ is calculated as $T_1 = K_2 \cdot (\Delta V_W - \Delta V_{OFF})$. The control torque $T_1$ may be calculated from a relationship that specifies the control torque $T_1$ as a function of first control gain $K_2$ and front and rear road wheel rotational speed difference $\Delta V_W$, as shown in FIG. 5B. At the point 228 in the program, the starting torque $T_2$ is set at zero. Following this, the program proceeds to the point 230.

At the point 230 in the program, the target torque T is set at the greater one of the control torque $T_1$ and the starting torque $T_2$. At the point 232 in the program, a torque-current characteristic table is used to convert the target torque T in to the corresponding solenoid drive current i. At the point 234 in the program, a dither current i* is calculated based on the solenoid drive current i as $i* = i \pm \Delta i \cdot f_0$. For example, $\Delta i = 0.1$A, $f_0 = 100$ Hz. After the calculated dither current i* is outputted to drive the solenoid valve 54, the program proceeds to the end point 236.

The operation of the torque split control apparatus of the invention will be described further.
(1) Vehicle Starting Condition When the vehicle is starting, the start flag $F_{START}$ is set to 1. Consequently, the control torque $T_1$ is calculated as $T_1 = K_1 \cdot \Delta V_W$ and the starting torque $T_2$ is calculated as $T_2 = K \cdot (\theta - \theta_0) + T_0$. The greater one of the calculated torques $T_1$ and $T_2$ is selected for the target torque T. When the road surface on which the vehicle starts has a low friction factor, the control torque $T_1$ is selected for the control torque T because a great front and rear road wheel rotational speed difference $\Delta V_W$ is produced with a small degree of depression of the accelerator pedal. In this case, the target torque T increases in direct proportion to the front and rear road wheel rotational speed difference $\Delta V_W$, as shown in FIG. 5A, because of the first control gain $K_1$ greater than the second control gain $K_2$ to provide a greater force under which the transfer clutch 28 is engaged. This is effective to transmit the torque with fast response from the engine 16 through the transfer clutch 28 to the front road wheels 12. It is to be noted that the starting torque $T_2$ is selected for the target torque T when the vehicle starts with a great degree of depression of the accelerator pedal on a road surface having a high friction factor.
(2) Vehicle Travelling Condition When the vehicle is moving in a straight or curved path, the start flag $F_{START}$ is cleared to zero. Consequently, the control torque $T_1$ is calculated as $T_1 = K_2 \cdot (\Delta V_W - \Delta V_{OFF})$ and the starting torque $T_2$ is calculated as $T_2 = 0$. Thus, the control torque $T_1$ is selected for the target torque T. When the road surface on which the vehicle is moving has a low friction factor, the control torque $T_1$ (in this case target torque T) increases in direct proportion to the front and rear road wheel rotational speed difference $\Delta V_W$ to increase the force under which the transfer clutch 28 is engaged in direct proportion to the front and rear road wheel rotational speed difference $\Delta V_W$, as shown in FIG. 5B, because of a smaller second control gain $K_2$. As a result, the torque is transmitted with slow response from the engine 16 through the transfer clutch 28 to the front road wheels 12. When the driver depresses the accelerator pedal to a somewhat excessive degree, the rear road wheels 14 tend to spin to provide an indication to the driver that the road surface has a low friction factor.
(3) Transient Condition When the vehicle operating condition shifts from the vehicle starting condition (1) to the vehicle travelling condition (2), that is, when the vehicle speed $V_{CAR}$ arrives at 20 km/h, the control torque $T_1$ is calculated as $T_1 = K_2 \cdot (\Delta V_{OFF})$. Assuming now that the vehicle is moving in a straight line with almost no lateral acceleration $Y_G$, the torque transmitted to the front road wheels 12 decreases at a great rate at the same time when the vehicle speed $V_{CAR}$ arrives at 20 km/h because of the decrease in the control gain from $K_1 = 7$ to $K_2 = 5$ and the use of the dead zone $\Delta V_{OFF}$. When the vehicle is moving in a curved path with a great lateral acceleration $Y_G$, the control gain is unchanged ($K_1 = K_2$) as can be seen from a comparison of FIGS. 4A and 4B. However, the torque transmitted to the front road wheels 12 decreases at the same time when the vehicle speed $V_{CAR}$ arrives at 20 km/h because of the use of the dead zone $\Delta V_{OFF}$. This decrease in the torque transmitted to the front road wheels 12 will produce a small change in the vehicle behavior to provide an indication to the driver that a change occurs from a 4WD control mode where a heavier weight is put on the traction performance to another 4WD control mode where a heavier weight is put on the driving safety.

While the invention has been described in connection with a 4WD vehicle where the rear wheels are the primary drive wheels and the front wheels are the secondary drive wheels, it is to be understood that the invention is also applicable to another 4WD vehicle where the front wheels are the primary drive wheels and the rear wheels are the secondary drive wheels.

What is claimed is:

1. A torque split control apparatus for use with a 4WD type automotive vehicle including an engine for producing a drive, the automotive vehicle being supported on a pair of primary drive wheels and a pair of secondary drive wheels, the apparatus comprising:
   means for transmitting the drive from the engine to the primary drive wheels and to the secondary drive wheels through a torque distributing clutch which can vary a torque transmitted to the secondary drive wheels;

means for sensing a wheel speed difference between speeds of rotation of the primary and secondary drive wheels;

means for sensing a vehicle lateral acceleration;

means for calculating a first control gain inversely proportional to the vehicle lateral acceleration and a second control gain inversely proportional to the vehicle lateral acceleration, the second control gain being smaller than the first control gain;

means for producing a start indication signal when the vehicle is starting;

means for calculating a target torque, the target torque being proportional to the first control gain and to the wheel speed difference in the presence of the start indication signal, the target torque being proportional to the second control gain and to the wheel speed difference in the absence of the start indication signal;

means for controlling the torque distributing clutch to transmit the calculated target torque to the secondary drive wheels.

2. The torque split control apparatus as claimed in claim 1, wherein the target torque calculating means including means for sensing a throttle valve position $\theta$, means for calculating a control torque $T_1$ as $T_1 = K_1 \cdot \Delta V_W$ where $K_1$ is the first control gain and $\Delta V_W$ is the wheel speed difference, means for calculating a starting torque $T_2$ as $T_2 = K \cdot (\theta - \theta_0) + T_0$ where K is a constant, $\theta_0$ is a predetermined throttle valve position value and $T_0$ is a predetermined torque value, and means for setting the target torque at a greater one of the calculated torques $T_1$ and $T_2$ in the presence of the start indication signal.

3. The torque split control apparatus as claimed in claim 1, wherein the target torque calculating means includes means for calculating the target torque T as $T = K_2 \cdot (\Delta V_W - \Delta V_{OFF})$ where $K_2$ is the second control gain, $\Delta V_W$ is the wheel speed difference and a $\Delta V_{OFF}$ is a predetermined dead zone in the absence of the start indication signal.

4. The torque split control apparatus as claimed in claim 3, wherein the target torque calculating means including means for sensing a throttle valve position $\theta$, means for calculating a control torque $T_1$ as $T_1 = K_1 \cdot \Delta V_W$ where $K_1$ is the first control gain and $\Delta V_W$ is the wheel speed difference, means for calculating a starting torque $T_2$ as $T_2 = K \cdot (\theta - \theta_0) + T_0$ where K is a constant, $\theta_0$ is a predetermined throttle valve position value and $T_0$ is a predetermined torque value, and means for setting the target torque at a greater one of the calculated torques $T_1$ and $T_2$ in the presence of the start indication signal.

5. The torque split control apparatus as claimed in claim 1, wherein the target torque calculating means includes means for sensing a vehicle speed, means for calculating a dead zone as a function of the sensed vehicle speed, and means FOR calculating the target torque T as $T = K_2 \cdot (\Delta V_W - \Delta V_{OFF})$ where $K_2$ is the second control gain, $\Delta V_W$ is the wheel speed difference and $\Delta V_{OFF}$ is the dead zone in the absence of the start indication signal.

6. The torque split control apparatus as claimed in claim 5, wherein the target torque calculating means including means for sensing a throttle valve position $\theta$, means for calculating a control torque $T_1$ as $T_1 = K_1 \cdot \Delta V_W$ where $K_1$ is the first control gain and $\Delta V_W$ is the wheel speed difference, means for calculating a starting torque $T_2$ as $T_2 = K \cdot (\theta - \theta_0) + T_0$ where K is a constant, $\theta_0$ is a predetermined throttle valve position value and $T_0$ is a predetermined torque value, and means for setting the target torque at a greater one of the calculated torques $T_1$ and $T_2$ in the presence of the start indication signal.

* * * * *